United States Patent [19]

Hassler et al.

[11] Patent Number: 5,523,554

[45] Date of Patent: Jun. 4, 1996

[54] SOLID STATE IMAGE CONVERTER WITH TWO OPPOSITELY CONNECTED DIODES WHEREIN THE PHOTODIODE IS RESET BY BEING FORWARD BIASED

[75] Inventors: Dietrich Hassler, Uttenreuth; Martin Hoheisel, Erlangen, both of Germany

[73] Assignee: Siemens Aktiengesellschaft, Munich, Germany

[21] Appl. No.: 262,690

[22] Filed: Jun. 20, 1994

[30] Foreign Application Priority Data

Jun. 30, 1993 [DE] Germany .......................... 43 21 789.3

[51] Int. Cl.⁶ .................................................... H01L 27/00
[52] U.S. Cl. ........................................ 250/208.1; 348/294
[58] Field of Search ...................... 250/208.1, 370.09, 250/370.11; 348/294, 302, 309; 257/291, 292, 443, 448, 458

[56] References Cited

U.S. PATENT DOCUMENTS

| | | | |
|---|---|---|---|
| 4,878,120 | 10/1989 | Matsumoto et al. | 358/213.19 |
| 4,948,966 | 8/1990 | Arques et al. | 250/208.1 |
| 4,957,659 | 9/1990 | Arques | 250/208.1 |
| 4,996,413 | 2/1991 | McDaniel et al. | 250/208.1 |
| 5,229,858 | 7/1993 | Ikeda et al. | 348/294 |
| 5,282,041 | 1/1994 | Tani et al. | 358/213.19 |
| 5,288,988 | 2/1994 | Hashimoto et al. | 250/208.1 |
| 5,331,145 | 7/1994 | Weckler et al. | 348/294 |
| 5,376,782 | 12/1994 | Ikeda et al. | 250/208.1 |

*Primary Examiner*—Edward P. Westin
*Assistant Examiner*—Steven L. Nichols
*Attorney, Agent, or Firm*—Hill, Steadman & Simpson

[57] ABSTRACT

A solid state image converter has light-sensitive cells arranged in a matrix, each cell formed by two oppositely-connected diodes, at least one diode in each cell being a photodiode, and has driver circuits for driving the diodes, that are connected between the respective row and column lines of the driver circuits. The driver circuits electrically reset the diodes individually or row-by-row by clocking. By briefly forward biasing, the individual photodiodes so that they are briefly brought into the conductive state, and are subsequently reverse biased. The solid state image converter can be continuously exposed with x-rays and is employable in an x-ray diagnostics installation.

28 Claims, 6 Drawing Sheets

SOLID STATE IMAGE CONVERTER WITH TWO OPPOSITELY CONNECTED DIODES WHEREIN THE PHOTODIODE IS RESET BY BEING FORWARD BIASED

BACKGROUND OF THE INVENTION

1. Field of the Invention

The present invention is directed to a solid state image converter of the type having light-sensitive cells arranged in a matrix, the cells comprising oppositely-connected diodes, with at least one diode being a photodiode, and having driver circuits for driving the diodes, the diodes being connected between the respective row and column lines of the driver circuits. Such solid state image converters serve the purpose, for example, of acquiring x-ray images in radiology.

2. Description of the Prior Art

For example, U.S. Pat. No. 4,948,966 discloses such a solid state image converter wherein two diodes are connected with opposite polarity between the row and column lines of the drive circuits. The photodiodes are operated in a storage mode using their self-capacitance, so that they can be sequentially read out after an exposure. It must be assured for real-time radiological image display that the read-out can ensue quickly enough and that image information of successive images (frames) do not mix.

For this reason, a reset that ensues by illuminating the matrix is provided between two read-out events. As a result, the photodiodes are completely discharged and rendered low-impedance. Since the illumination cannot ensue row-by-row, a simultaneous, common resetting of the entire array is undertaken. Due to the subsequent row-by-row, sequential read-out, however, time intervals of different lengths arise between the common resetting and the read-out of the respective rows.

In an x-ray diagnostics installation, the x-ray image converter can be composed of such a photodiode matrix on which a scintillator layer is applied, for converting the incident x-radiation into light. In order to avoid measuring times of different lengths, irradiation can be carried out with a switchable x-ray tube that enables an equally long illumination of all diodes of the array. The switchable x-ray tube with its associated voltage generator and the light source for the resetting, however, represent a considerable outlay.

German PS 35 46 487 discloses a solid state image sensor wherein the picture elements, arranged in a matrix, are each composed of a field effect transistor and the matrix is driven by row and column scanning circuits. During the illumination period, the source and drain regions are reverse biased. During the read-out period, the source as well as drain regions are connected to ground potential.

German OS 39 51 547 discloses an apparatus for driving an image pick-up element that is composed of a CCD image converter. The matrix-like photodiodes emit their output signal charges to a transfer CCD after the expiration of the illumination time, so that the charges can be subsequently read out.

SUMMARY OF THE INVENTION

It is an object of the present invention to provide a solid state image converter of the type generally described that enables a simple resetting of the light-sensitive cells without the need for switchable illumination.

This object is inventively achieved in a solid state image converter constructed in accordance with the principles of the present invention, wherein the driver circuits are fashioned such that the photodiodes are electrically reset by clocking, so as to bring the individual photodiodes briefly into the conductive state. This achieves resetting of the photodiodes in a simple way regardless of their illumination.

It has proven advantageous when the driver circuits are fashioned such that the photodiodes are reset either individually or row-by-row. This can also be inventively achieved when the driver circuits are fashioned such that the photodiodes are briefly reverse biased.

A direct conversion of x-rays into electrical signals can be achieved when a scintillator layer composed of a material sensitive to x-rays is applied on the solid state image converter of the invention.

A simple drive of the photodiodes of a solid state image converter, in an embodiment wherein each of the light-sensitive cells has at least one switching diode, can be achieved when a multiple diode having opposite polarity, or a field effect transistor (FET), is connected parallel to each switching diode. In one version, a Zener diode is connected in series with each switching diode. In another version, each switching diode is connected to a reset line, for example via a series circuit of a diode and a resistor.

The solid state image converter thus can be continuously illuminated and can be employed in an x-ray diagnostics installation.

DESCRIPTION OF THE PREFERRED EMBODIMENTS

Figure 1:
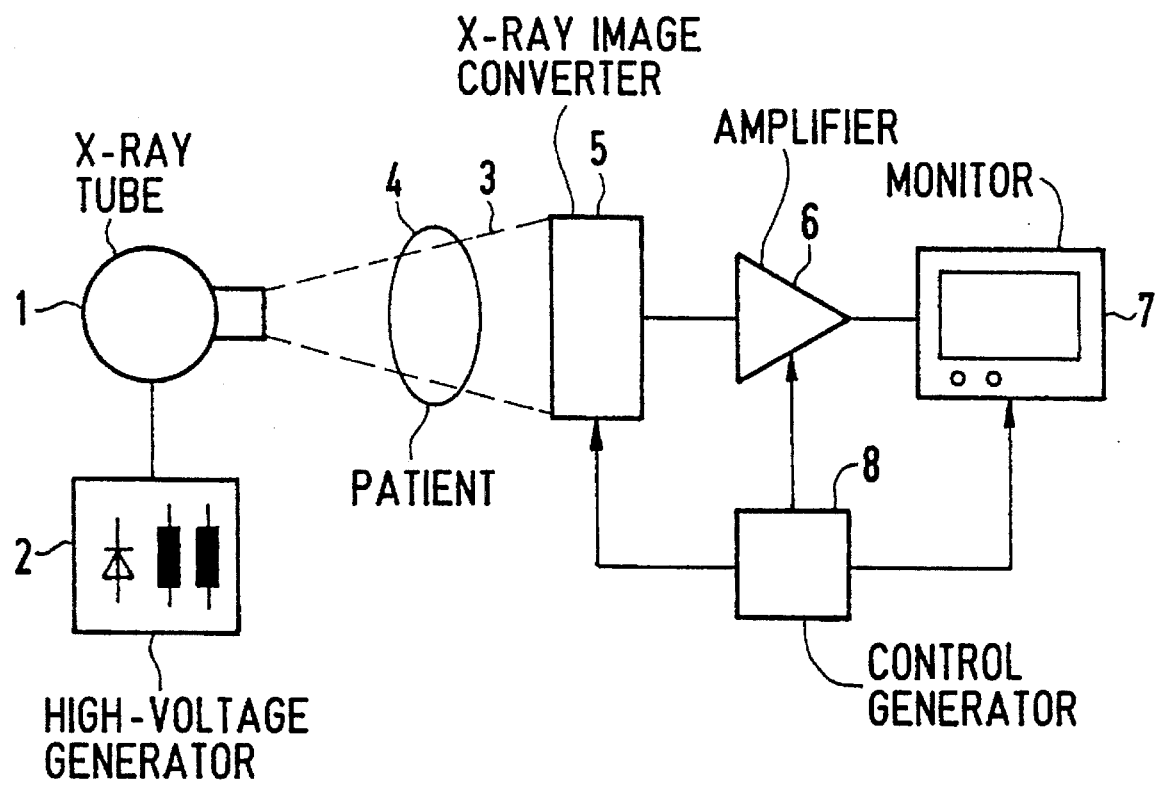
FIG. 1 is a schematic block diagram of a known x-ray diagnostics installation.

FIG. I shows a known x-ray diagnostics installation having an x-ray tube 1 that is operated by a high-voltage generator 2. The x-ray tube I emits an x-ray beam 3 that penetrates a patient 4 and is incident on an x-ray image converter 5 in conformity with the transparency of the patient. Via an amplifier 6, the x-ray image converter 5 is connected to a monitor 7 for playback of the x-ray image. The electronic components 5, 6 and 7 of the video chain are connected to a control generator 8 for synchronization and control.

In such an x-ray diagnostics installation, the x-ray image converter 5 can be formed by, as is known, a photodiode matrix on which a scintillator layer is applied, the latter converting x-radiation into light. The photodiode matrix can be composed of hydrogenated amorphous silicon (aSi:H).

Figure 2:
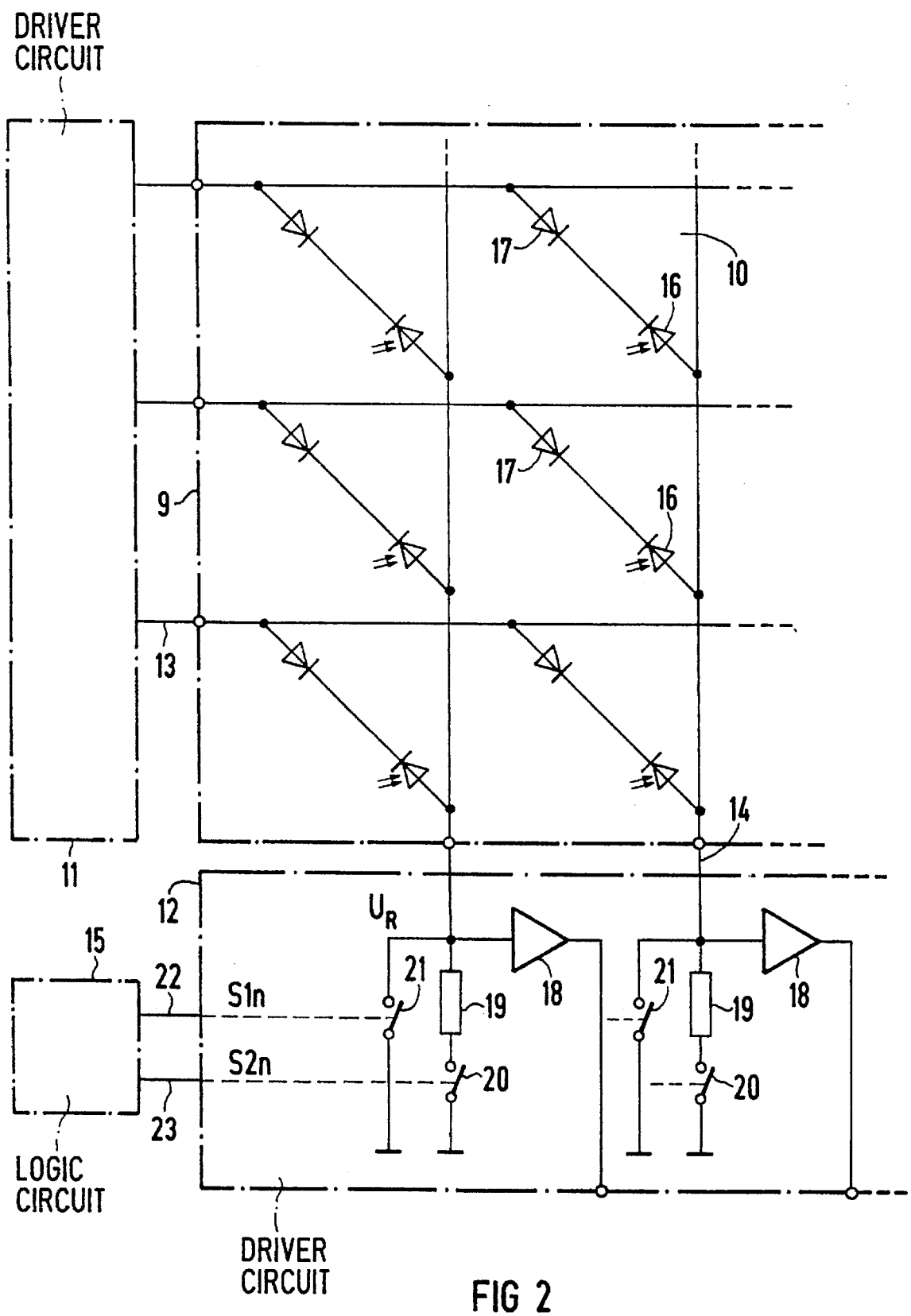
FIG. 2 shows a part of a solid state image converter of the invention.

FIG. 2 shows an x-ray converter 5 constructed in accordance with the principles of the present invention as a solid state image converter which has a matrix array 9 that is composed of individual light-sensitive cells 10, arranged in n rows and m columns. These cells 10 are connected to a first driver circuit 11 via row lines 13 and are connected to a second driver circuit 12 or receiver circuit for read-out via column lines 14. A logic circuit 15 is connected to the second driver circuit 12.

The individual light-sensitive cells 10 are each composed of a photodiode 16 and a switching diode 17, whose cathodes are connected to one another and whose anodes are, respectively, connected to the row lines 13 or column lines 14.

For each column, the driver circuit 12 is composed of a pre-amplifier 18 that is connected to the respective column line 14. The inputs of the pre-amplifiers 18 are connected to ground via a resistor 19 and a first switch 20 and, parallel thereto, via a second switch 21. The two switches 20 and 21 are controlled by the logic circuit 15 via control lines 22 and 23.

In the invention, the x-ray means is continuously operated and a reset illumination is foregone. Instead, reliance is on the switching diodes 17 of the matrix-shaped array exhibiting defined properties with respect to their breakdown in the blocking direction, the Zener voltage. The invention is based on the idea of also achieving a resetting by forward biasing the photodiodes into a short time, and then again reverse biasing the photodiodes. Remaining differences of the recharging are thereby not dependent on the prior history of the illumination but, on the contrary, on the technology and type of drive. These differences are stable and can be compensated by the normally provided correction per pixel.

Figure 3:
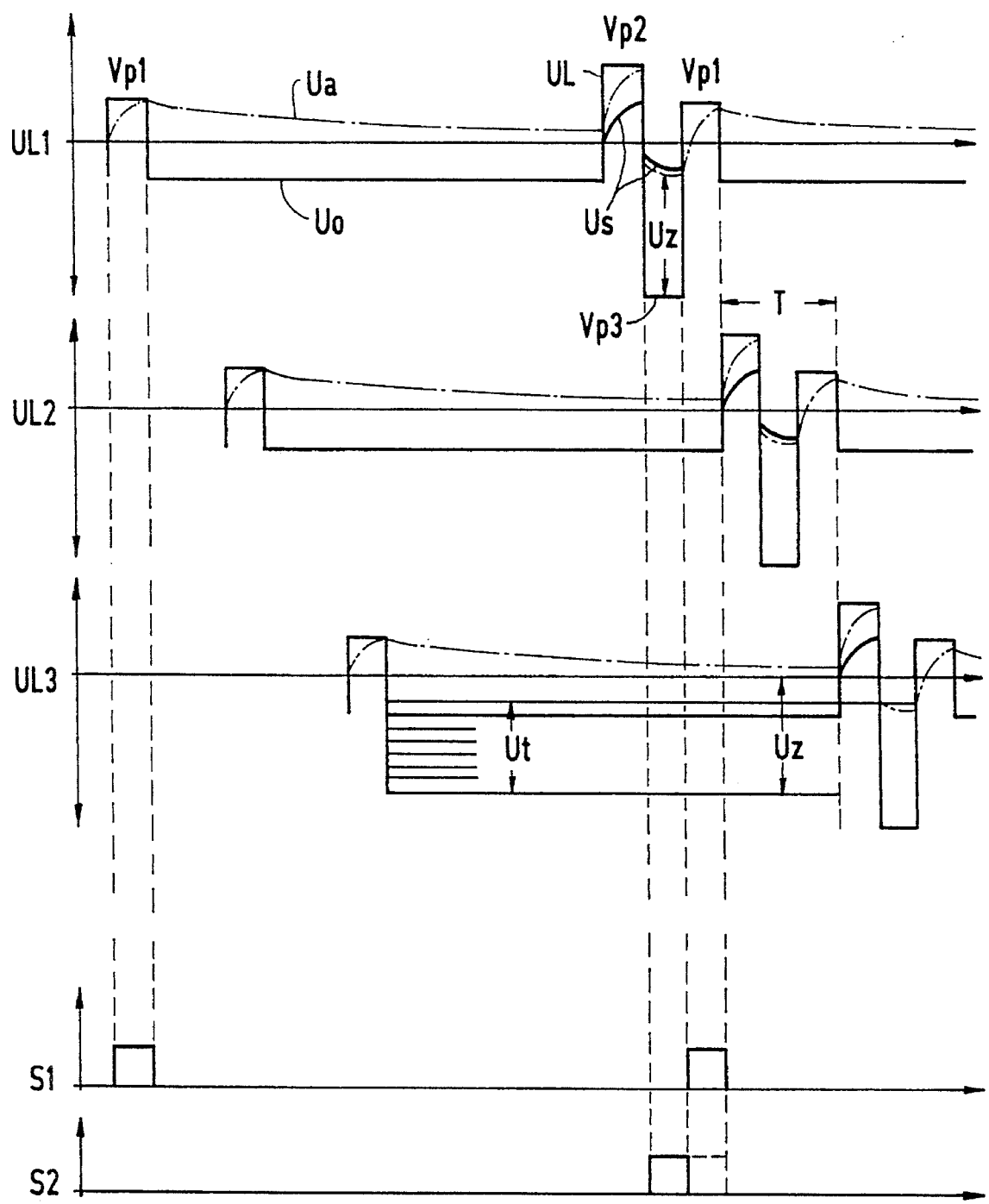
FIGS. 3–6 are curves for explaining the invention.

The inventive reset principle leads to a modified pulse sequence in the drive of the matrix array 9, as set forth in greater detail with reference to FIG. 2 in conjunction with FIG. 3.

The photodiodes 16 can be electrically reset pixel-by-pixel or row-by-row by operating the switching diode with a reverse bias. To that end, the Zener voltage Uz of the switching diode 17 must be reached and a current arising due to the avalanche effect must be obtained.

A negative control pulse Vp3 is therefore introduced that is simultaneously generated with the closing pulse S2 of the switch 20. The amount of the voltage of the control pulse Vp3 is greater than the Zener voltage Uz. Without taking the threshold voltage of the photodiode 16 into consideration, the voltage drop across the resistor 19 represents the difference between the voltage of the control pulse Vp3 and the Zener voltage Uz, as a result of which the strength of the current can be defined. The voltage $U_R$ should be selected large in comparison to the fluctuation of the Zener voltage Uz. When the Zener voltages Uz have a low fluctuation, then the voltage Ur can be kept correspondingly lower, so that disturbances due to cross-talk remain slight.

The negative voltage Us (Vp3), which is equal to the voltage at the resistor Ur, is also across the diodes 16 and 17 of the non-driven rows via the column lines 14. In order to reliably keep the switching diodes 17 of these rows reverse biased, a negative voltage Uo is defined for the off state of the rows instead of zero volts as is standard. The tolerance range Ut of this voltage for the off state lies—in terms of magnitude—between the maximum value of $U_R$ and the minimum value of Uz. Impractical demands are thus not made with regard to the tolerance of Uz.

The control pulse Vp3 is followed by the control pulse Vp1 insures recharging to a uniform voltage level, as previously would occur given a closed switch 21. The integration phase for the light measurement begins with the end of this control pulse Vp1, this integration phase being ended in a known way by the read-out control pulse Vp2 when the switches 20 and 21 are opened. The spacing of the packets of the control pulses Vp1 through Vp3 of a row relative to one another now defines the measurement time, differing from known converters wherein the duration of the illumination defines the measuring time.

When, for example, a matrix of 1000×1000 picture elements is to be read out in 40 ms (25 Hz) given parallel interrogation of all columns and sequential drive of all rows, then a time of T=40 μs is available for read-out and resetting, i.e. for the aforementioned packet of control pulses Vp1 through Vp3. As FIG. 2 shows, the packets of the control pulses Vp1 through Vp3 of all rows are joined to one another tightly packed in order to optimally utilize the time. Despite the differently graduated read-out times, the measuring times lying between the packets of the control pulses Vp1 through Vp3 are of equal length in all rows, so that the matrix can be operated in a continuous exposure or continuous irradiation mode.

In known methods, only a small percentage of the time for a frame of 40 ms is available for irradiation. The x-ray tube in such known systems must therefore be able to be pulsed and the power pack must be capable of briefly supplying higher currents for a comparable dose.

Figure 4:
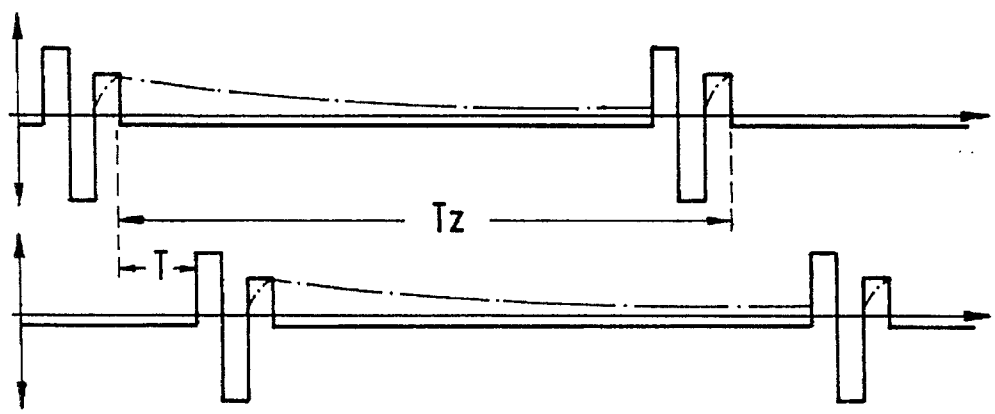
Figure 5:
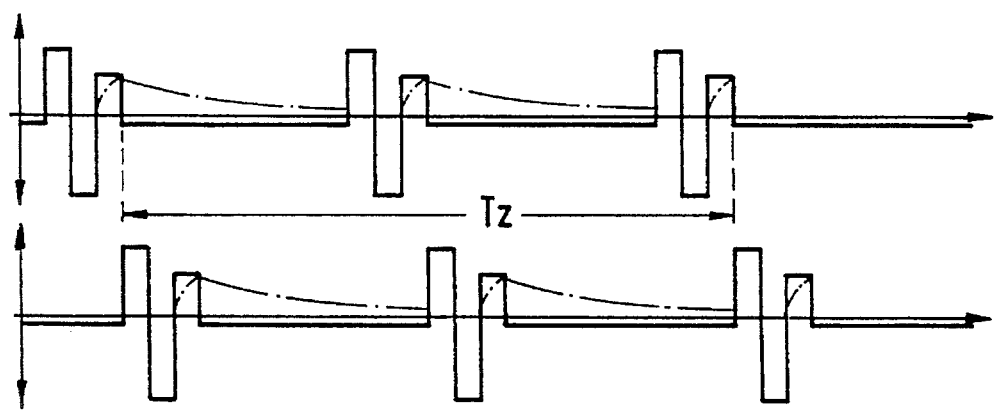

When, given unmodified image repetition rate, the packet of control pulses Vp1 through Vp3 can be kept shorter (T=20 μs in the example), or when the repetition rate can be made longer so that "air" is between the pulse packets, multiple read-out can be carried out more rapidly in succession and the integration time can be shortened by reducing the chronological spacing of the packets of the control pulses Vp1 through Vp3. This is shown by a comparison of FIG. 4, which shows a short pulse packet or a low image repetition rate, and FIG. 5, which shows a doubling of the read-out per image; it is clear from these Figures that two read-outs given approximately half the sensitivity ensue when the measuring time Tz is approximately halved. In order to optimally utilize the continuous x-radiation, the values of the two read-outs are averaged with one another within the measuring time Tz, so that the dynamics are preserved. A so-called "electronic iris diaphragm" in the x-ray image intensifier video chain is thereby obtained.

Figure 6:
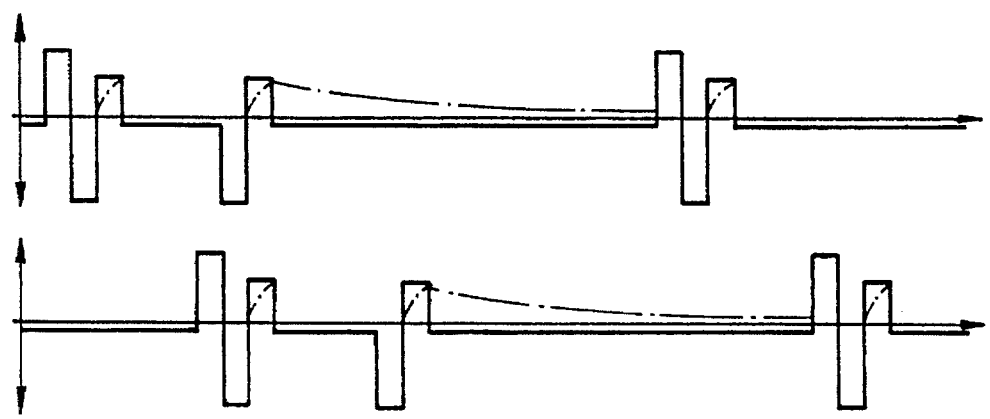
Figure 7:
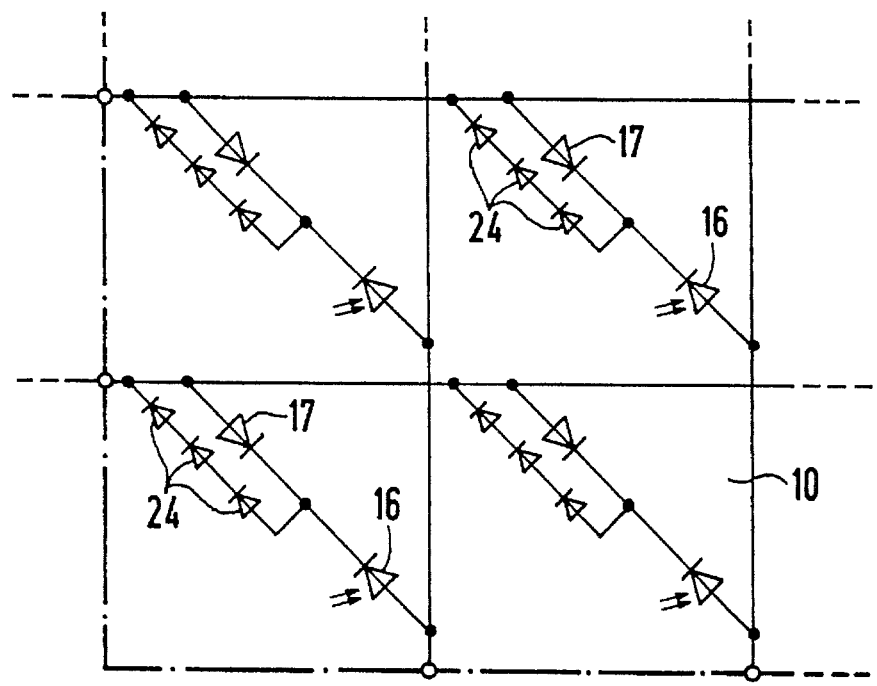
FIGS. 7–10, respectively, show further embodiments of the solid state image converter of the invention.

When one does not wish to completely utilize all of the incident x-radiation, the control pulses for resetting Vp1 and Vp3 can be respectively supplied to two rows, as shown with reference to FIG. 6 for illustrating the reduced sensitivity of two neighboring rows. As a result of the second reset, the integration time is shortened, and thus the sensitivity is reduced. The effect of the shorter integration or measuring time Tz increases with increasing distance between the driven rows.

The two possibilities of setting the sensitivity enable a narrowing of the dynamics. This can save costs. A different sensitivity control can be implemented for the individual rows.

Since, in practice, the diodes of the array have a relatively high bulk series resistance, it is assured that the Zener current Uz is limited, so that the resistors 19, and thus the switch 20, can also be eliminated under certain circumstances, so that a shut-off voltage U0 of zero volts can be used.

Figure 8:
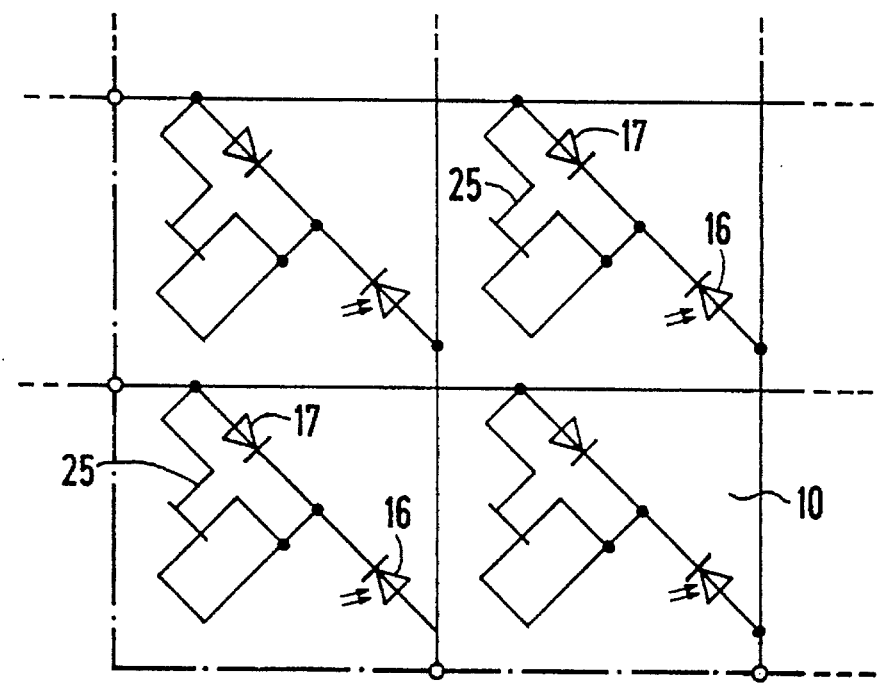
Figure 9:
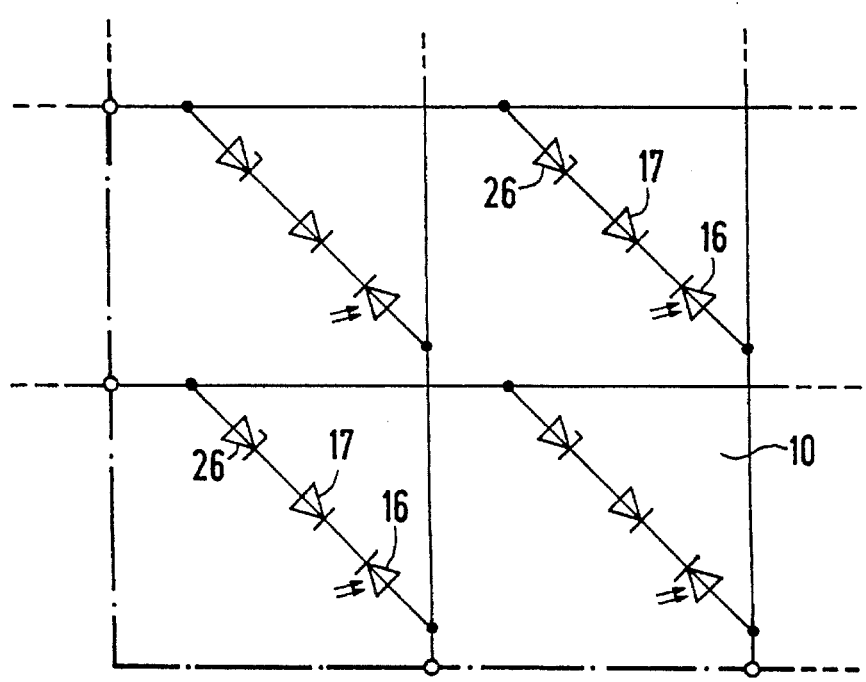

Alternative solutions of the invention having auxiliary components are set forth with reference to FIGS. 7–10. One can manage without a plurality of terminals for the matrix array 9 when, according to FIG. 7, multiple diodes 24—for example, three individual diodes for each pixel—or, as shown in FIG. 8, field effect transistors (FET) 25 having a suitable characteristic—are connected parallel to the switching diode 17 in order to obtain a voltage that can be defined better as substitute for the Zener voltage Uz.

In the invention, a Zener diode 26 (see FIG. 9) can also be arranged in series with the switching diode 17, so that less of a scatter of the Zener voltage Uz can be achieved. A reverse biasing voltage of the switching diode 17 is thereby assumed that is small in comparison to the Zener voltage Uz. The switching diode 17 insures low turn-off capacitances.

Figure 10:
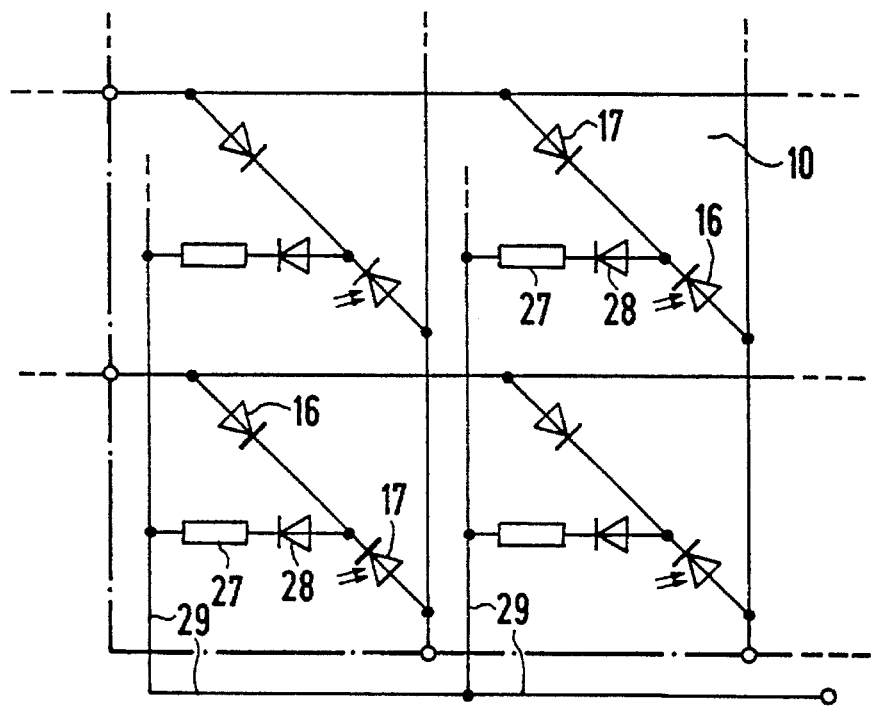

According to the invention, a common electrical resetting can be achieved by an additional line 29 shown in FIG. 10 that is connected to the junction of the photodiode 16 and the switching diode 17 via a series branch formed by resistor 27 and a diode 28, so that an illumination means required for the illumination of the light-sensitive cells 10 can be eliminated. In this case, however, a pulsed x-ray source is necessary.

In instances wherein the Zener current should not fluctuate by more than 100/n% and when $\delta Uz$ is assumed as the maximum amount of the fluctuation of the Zener voltage Uz, then the following can be specified for calculating the tolerance:

$$Uz - \delta UZ - n, \delta Uz > 0$$

For the limit case=0,:

$$\frac{\delta Uz}{Uz} = \frac{1}{1+n}$$

The following is obtained for n=2:

$$\frac{\delta Uz}{Uz} = \frac{1}{3},$$

This means that the tolerance corresponds to a maximally allowed fluctuation of ±33% given n=3.

Although modifications and changes may be suggested by those skilled in the art, it is the intention of the inventors to embody within the patent warranted hereon all changes and modifications as reasonably and properly come within the scope of their contribution to the art.

We claim as our invention:

1. A solid state image converter comprising:
   a matrix consisting of a plurality of light-sensitive cells arranged in rows and columns in said matrix;
   each cell including two oppositely-connected diodes, a first of said diodes being a photodiode and a second of said diodes being a switching cell, and a series branch consisting of multiple diodes connected with opposite polarity in parallel with said switching diode;
   a first driver circuit, connectable to each of said diodes in said cells, for driving said cells column-by-column;
   a second driver circuit, connected to each of said diodes in said cells, for driving said cells row-by-row; and
   at least one of said first and second driver circuits including means for electrically resetting said photodiodes by clocking said photodiodes by briefly connecting a forward-biasing voltage across said photodiodes to bring said photodiodes briefly into a conductive state.

2. A solid state image converter as claimed in claim 1 wherein said means for resetting comprises means connected to said photodiodes for individually resetting each photodiode.

3. A solid state image converter as claimed in claim 1 wherein said means for resetting is included in said second driver circuit, and comprises means for resetting said photodiodes row-by-row.

4. A solid state image converter as claimed in claim 1 wherein said driver circuits each comprise means for briefly reverse-biasing said photodiodes after electrically resetting said photodiode.

5. A solid state image converter as claimed in claim 1 further comprising:
   a scintillator layer consisting of a material sensitive to x-rays covering said matrix.

6. A solid state image converter as claimed in claim 1 further comprising:
   a scintillation layer for converting x-rays into light covering said matrix;
   means for exposing said scintillation layer to x-rays attenuated by an examination subject in an x-ray diagnostics system; and
   means for displaying an image of said subject corresponding to x-rays converted into light by said scintillation layer and converted into electrical signals by said solid state image converter.

7. A solid state image converter as claimed in claim 6 wherein said means for exposing said scintillation layer to x-rays comprises means for continuously exposing said scintillation layer to x-rays.

8. A solid state image converter comprising:
   a matrix consisting of a plurality of light-sensitive cells arranged in rows and columns in said matrix;
   each cell including two oppositely-connected diodes, a first of said diodes being a photodiode, and a second of said diodes being a switching diode, and a field effect transistor connected in parallel with said switching diode;
   a first driver circuit, connectable to each of said diodes in said cells, for driving said cells column-by-column;
   a second driver circuit, connected to each of said diodes in said cells for driving said cells row-by-row; and
   at least one of said first and second driver circuits including means for electrically resetting said photodiodes by clocking said photodiodes by briefly connecting a forward-biasing voltage across said photodiodes to bring said photodiode, briefly into a conductive state.

9. A solid state image converter as claimed in claim 8 wherein said means for resetting comprises means connected to said photodiodes for individually resetting each photodiode.

10. A solid state image converter as claimed in claim 8 wherein said means for resetting is included in said second driver circuit, and comprises means for resetting said photodiodes row-by-row.

11. A solid state image converter as claimed in claim 8 wherein said driver circuits each comprise means for briefly reverse-biasing said photodiodes after electrically resetting said photodiodes.

12. A solid state image converter as claimed in claim 8 further comprising:
   a scintillator layer consisting of a material sensitive to x-rays covering said matrix.

13. A solid state image converter as claimed in claim 8 further comprising:
   a scintillation layer for converting x-rays into light covering said matrix;
   means for exposing said scintillation layer to x-rays attenuated by an examination subject in an x-ray diagnostics system; and
   means for displaying an image of said subject corresponding to x-rays converted into light by said scintillation layer and converted into electrical signals by said solid state image converter.

14. A solid state image converter as claimed in claim 13 wherein said means for exposing said scintillation layer to x-rays comprises means for continuously exposing said scintillation layer to x-rays.

15. A solid state image converter comprising:

a matrix consisting of a plurality of light-sensitive cells arranged in rows and columns in said matrix;

each cell including two oppositely connected diodes, a first of said diodes being a photodiode and a second of said diodes being a switching diode, and a Zener diode connected in series with said switching diode;

a first driver circuit, connectable to each of said diodes in said cells for driving said cells column-by-column;

a second driver circuit, connected to each of said diodes in said cells, for driving said cells row-by-row; and at least one of said first and second driver circuits including means for electrically resetting said photodiodes by clocking said photodiodes by briefly connecting a forward-biasing voltage across said photodiodes to bring said photodiodes briefly into a conductive state.

16. A solid state image converter as claimed in claim 15 wherein said means for resetting comprises means connected to said photodiodes for individually resetting each photodiode.

17. A solid state image converter as claimed in claim 15 wherein said means for resetting is included in said second driver circuit, and comprises means for resetting said photodiodes row-by-row.

18. A solid state image converter as claimed in claim 15 wherein said driver circuits each comprise means for briefly reverse-biasing said photodiodes after electrically resetting said photodiodes.

19. A solid state image converter as claimed in claim 15 further comprising:

a scintillator layer consisting of a material sensitive to x-rays covering said matrix.

20. A solid state image converter as claimed in claim 15 further comprising:

a scintillation layer for converting x-rays into light covering said matrix;

means for exposing said scintillation layer to x-rays attenuated by an examination subject in an x-ray diagnostics system; and means for displaying an image of said subject corresponding to x-rays converted into light by said scintillation layer and converted into electrical signals by said solid state image converter.

21. A solid state image converter as claimed in claim 20 wherein said means for exposing said scintillation layer to x-rays comprises means for continuously exposing said scintillation layer to x-rays.

22. A solid state image converter comprising:

a matrix consisting of a plurality of light-sensitive cells arranged in rows and columns in said matrix;

each cell including two oppositely-connected diodes, at least one of said diodes being a photodiode;

a first driver circuit, connectable to each of said diodes in said cells for driving said cells column-by-column;

a second driver circuit, connected to each of said diodes in said cells, for driving said cells row-by-row;

at least one of said first and second driver circuits including means for electrically resetting said photodiodes by clocking said photodiodes by briefly connecting a forward-biasing voltage across said photodiodes to bring said photodiodes briefly into a conductive state, said means for electrically resetting said photodiodes including a reset line connected between said at least one of said first and second drive circuits and said diodes in each of said cells; and each said cell further comprising a series branch consisting of a further diode and a resistor connected between the diodes in said cell and said reset line.

23. A solid state image converter as claimed in claim 22 wherein said means for resetting comprises means connected to said photodiodes for individually resetting each photodiode.

24. A solid state image converter as claimed in claim 22 wherein said means for resetting is included in said second driver circuit, and comprises means for resetting said photodiodes row-by-row.

25. A solid state image converter as claimed in claim 22 wherein said driver circuits each comprise means for briefly reverse-biasing said photodiodes after electrically resetting said photodiodes.

26. A solid state image converter as claimed in claim 22 further comprising:

a scintillator layer consisting of a material sensitive to x-rays covering said matrix.

27. A solid state image converter as claimed in claim 22 further comprising:

a scintillation layer for converting x-rays into light covering said matrix;

means for exposing said scintillation layer to x-rays attenuated by an examination subject in an x-ray diagnostics system; and means for displaying an image of said subject corresponding to x-rays converted into light by said scintillation layer and converted into electrical signals by said solid state image converter.

28. A solid state image converter as claimed in claim 27 wherein said means for exposing said scintillation layer to x-rays comprises means for continuously exposing said scintillation layer to x-rays.

* * * * *